United States Patent [19]

Barge et al.

[11] 4,188,303
[45] Feb. 12, 1980

[54] POLYMERIC ELECTRICAL INSULATORS HAVING INCREASED RESISTANCE TO PARTIAL DISCHARGES CONTAINING METAL CHELATES

[75] Inventors: Jean Barge, Paris la Defense; Raymond Catte, Lacq; Gilbert Chapelet, Symphorien d'Ozon; Ai Bui, Toulouse; Pierre Dejean, Sens; Claude Huraux; Christian Mayoux, both of Toulouse, all of France

[73] Assignee: Agence Nationale de Valorisation de la Recherche (ANVAR), Neuilly-sur-Seine, France

[21] Appl. No.: 902,007

[22] Filed: May 1, 1978

Related U.S. Application Data

[63] Continuation of Ser. No. 588,207, Jun. 19, 1975, abandoned.

[30] Foreign Application Priority Data

Jun. 21, 1975 [FR] France .......................... 75 21779

[51] Int. Cl.² .............................................. H01B 3/18
[52] U.S. Cl. ................................ 252/63.7; 260/45.75 P; 260/45.9 R; 174/110 SR; 174/DIG. 1; 252/63.5
[58] Field of Search ....................... 252/63–66; 260/45.7 SP, 45.7 SC, 45.7 SW, 45.9 R, 45.9 AD; 174/DIG. 1, 110 SR

[56] References Cited

U.S. PATENT DOCUMENTS

| | | | |
|---|---|---|---|
| 2,465,296 | 3/1949 | Swiss ................................ | 252/63.5 |
| 3,826,747 | 7/1974 | Nagashima et al. ................ | 252/62.1 |
| 3,931,026 | 1/1976 | Berkner ............................. | 252/63.7 |

FOREIGN PATENT DOCUMENTS 1901653  7/1970  Fed. Rep. of Germany .......... 252/63.5

*Primary Examiner*—John D. Welsh
*Attorney, Agent, or Firm*—Sprung, Felfe, Horn, Lynch & Kramer

[57] ABSTRACT

The invention relates to electrical insulators having increased resistance to partial discharges and electrical equipment comprising such electrical insulators.

These electrical insulators are formed of a macromolecular material in which is incorporated a chelate which is a derivative of an organic compound of general formula:

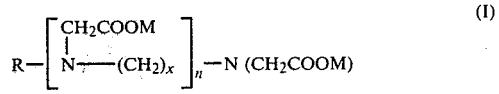

wherein:
R is $CH_2COOM$ or —OH,
M is Na or H,
x is an integer from 1 to 4,
n is an integer from 0 to 4, the metal chelate being present in the material in an amount sufficient for promoting the extinction of partial discharges, said amount not exceeding a value which would alter the physical properties of the insulator such as the volume resistivity thereof.

20 Claims, No Drawings

POLYMERIC ELECTRICAL INSULATORS HAVING INCREASED RESISTANCE TO PARTIAL DISCHARGES CONTAINING METAL CHELATES

This is a continuation of application Ser. No. 588,207 filed June 19, 1975, now abandoned.

This invention relates to electrical insulators formed from macromolecular materials having improved properties in particular with respect to partial discharges.

It is known that, owing to imperfect homogeneity, macromolecular insulating materials comprise minute cavities or voids which often contain a gas, especially air. When the insulator is subjected to an electrical field, a fraction of the field is established between the opposite faces of the voids. These phenomena are referred to hereafter as partial discharges in the insulators. The existence of such partial discharges eventually causes an erosion of the insulating material. In spite of efforts expended for obtaining as homogenous materials as possible, the voids are never entirely eliminated. Partial discharges may occur in all insulating systems subjected to high electrical fields. The problem is to the greatest importance in the case of insulating sheaths for electric power lines, or capacitor dielectrics.

The invention aims to provide an electrical insulator in which the partial discharges and the resulting erosion are eliminated or at least greatly reduced. The invention aims at obtaining this result without otherwise modifying the properties of the insulator. The invention further aims to provide electrical equipment in which high electrical fields are liable to appear, and comprising at least one electrical conductor, in contact with an insulator, said electrical equipment being efficiently protected against partial electrical discharges which may occur, within the insulator.

The electrical insulator, according to the invention, is essentially formed of a macromolecular material, containing an agent improving its resistance to partial discharges under high electric fields, said agent being incorporated into the macromolecular material and being formed by at least one metal chelate which is a derivative of an organic compound of the general formula:

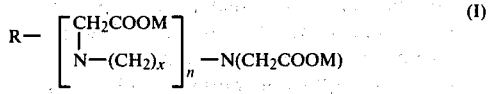

wherein:
R is $CH_2COOM$ or $-OH$,
M is Na or H,
x is an integer, from 1 to 4,
n is an integer from 0 to 4, the metal chelate being present in the material in an amount sufficient for promoting the extinction of partial discharges, said amount not exceeding a value which would alter the dielectric properties of the insulator, such as the volume resistivity thereof.

The electrical equipment, according to the invention, in which high electrical fields are liable to appear, and which comprise at least an electrical conductor to contact with an insulator, is characterized in that the insulator contains at least one metallic chelate incorporated therein having a structure as defined above.

It has been noted that the incorporation of such chelate into the insulator material considerably decreases the phenomena of partial discharges therein, without substantially modifying its other properties.

A preferred family of chelates especially suitable for carrying out the invention consists of compounds of the above formula, in which x is 2 or 3 and n is zero, 1 or 2. In particular the following compounds can be used:
  ethylene-diamino-tetracetic acid
  propylene-diamino-tetracetic acid
  N-hydroxy-ethylene-diamino-triacetic acid
  diethylene-triamino-pentacetic acid
  nitrilo-triacetic acid.

Preferred metals for forming chelates with the above-mentioned organic compounds are iron, copper, zinc, aluminum or cadmium.

However, any metal capable of forming such chelates may be used provided that it does not modify substantially the dielectric properties of the insulator.

Finally, sodium atoms can be substituted for the hydrogen of one or several acid functions of the organic compounds of formula (I).

Preferred chelates are those which are formed by ethylene-diamino-tetracetic acid and, more specifically, compounds in which each acid molecule has respectively corresponding thereto:
  2 Na, Cu
  2 Na, Pb
  Na, Fe It is of great interest to note that the effect sought is obtained with very low proportions of these chelates. Thus, an effect has been detected for chelate contents as low as 0.001% by weight with respect to the macromolecular compound. Generally these compounds are used in proportions between about 0.001 and about 5% and preferably between 0.01 and 1% by weight.

The insulators can be formed starting from a large variety of macromolecular compounds, particularly of all macromolecular compounds used or usable in the production of insulating material, for example polymers such as polyethylenes; polycondensates such as polyesters; or polyaddition compounds such as polyepoxides.

The invention is advantageously applied to polyethylenes, in particular to "low-density polyethylenes", free from metal traces.

Concerning the mode of action of the chelates in the macromolecular compound, the following hypothesis can be put forth:

The extinction of partial discharges could be due to a local decrease of surface resistivity of the walls of the voids under the effect of these discharges, as the results of the subsequently presented tests seem to show.

One hypothesis for the local decrease of surface resistivity of the walls of the voids would hold that by the rupture, caused by the partial discharges, of links between the metal ion and the remaining portion of the organic molecule of the chelate. This induces a local release of metal exclusively on the walls of the voids or similar cavities. The metal release would therefore be associated with a local increase of conductivity which tends to prevent the formation of a partial arc in the less conductive gas within the voids. This, in turn, causes an elevation of the threshold voltage beyond which partial arcs are likely to be produced.

It has been noted to the contrary that the macromolecular dielectric properties of the modified insulators of the invention, in contrast to localized measurements of void wall resistivity, are not altered substantially. For practical purposes the volume resistivity, the surface resistivity at macroscopic scale and the dielectric rigidity do not appear to be modified.

The interest in using chelates for increasing the resistance of insulators to partial discharges resides in the fact that the metals which they contain remain trapped within the organic molecule so that, at a macroscopic scale, such metals do not substantially alter the dielectric properties of the insulator insofar as the molecules of the chelate under consideration are not directly affected by the arcs discharges.

A significant and original benefit of the invention is that such chelates specified herein do not significantly alter the conductivity or dielectric properties of the insulator and exert their action under the influence of arc discharge exclusively at the precise location where the arc discharge appeared. Thus, the possibility of particles migrating under the action of the electric field is limited.

Comparative Tests Between Polyethylene Samples Modified in Accordance with the Invention and Control Samples In these tests, use has been made of low-density polyethylene samples available under the trade name lacqtene 1020 FN 18, containing various concentrations of chelates and, in particular, chelates of ethylene-diamino-tetracetic acid, the molecular formula of which corresponds to:

ethylene-diamino-tetracetic acid, 2 Na, Cu
ethylene-diamino-tetracetic acid, Na, Fe Test samples have been split into two groups, those which were subjected or to discharges in air prior to testing and those which were not.

Preliminary tests have shown that the highest concentrations of chelates used in the tests did not induce substantial modifications of the values of the dielectric constants of the corresponding samples.

The surface and volume resistivities were measured in accordance with ASTM D-257(part 27) standards.

The measurements were made using of 4.5 KV RMS, the air layer between the test sample and the measuring electrode being set at 0.7 mm.

The following tables show the values of volume and surface resistivities measured both on control samples and on various samples containing increasing amounts of the chelates under consideration, both before and after exposure to arc discharges in air. In the left column of the tables, the term "exposed" means that said samples have been subjected over a nine hour period to partial discharges before the measurement was carried out.

| Concentration of chelate | | 0 | 0.01% | 0.05% | (by weight) 0.1% |
|---|---|---|---|---|---|
| Electric characteristics | | | | | |
| non exposed | P v$\Omega$cm | >$10^{19}$ | $10^{18}$ | $10^{18}$ | $10^{18}$ |
|  | P s$\Omega$ | >$10^{19}$ | $10^{18}$ | $10^{18}$ | $10^{18}$ |
| exposed | P v$\Omega$cm | $10^{18}$ | $10^{18}$ | $10^{18}$ | $10^{18}$ |
|  | P s$\Omega$ | $10^{18}$ | $2 \times 10^{13}$ | $3 \times 10^{12}$ | $7 \times 10^{12}$ |

| Concentration of chelate (by weights) | | 0 | 0.1% |
|---|---|---|---|
| Electric Characteristics | | | |
| non exposed | P v$\Omega$cm | >$10^{19}$ | $10^{18}$ |
|  | P s$\Omega$ | >$10^{19}$ | $10^{18}$ |
| exposed | P v$\Omega$cm | $10^{18}$ | $10^{18}$ |
|  | P s$\Omega$ | $10^{18}$ | $8.10^{12}$ |

As made clear upon considering the tables, significant results are obtained with concentrations of chelates as low as 0.01% by weight.

The tables show in the first place that, independent of the concentration, the chelates thereof incorporated into the macromolecular material do not as a practical matter modify the volume resistivity values of the latter for samples which have not been subjected to partial discharges.

On the contrary the local or macromolecular surface resistivity of the test samples which have been subjected to partial discharges exhibits very substantial changes, even when very low concentrations of chelate have been used.

Moreover, polyethylene samples containing the aforesaid chelates exhibit a very substantial increase of the "threshold voltage" when being subjected to partial discharges. This threshold voltage, i.e. the voltage at which partial discharges appear in the samples, increases as a function of the time of exposure of the sample to these discharges. By way of comparison, for a sample which does not contain any chelate, the threshold voltage remains substantially unchanged when the sample has been previously subjected to partial discharges.

The introduction of the chelates into the macromolecular compounds can be effected by all known means for introduction of additives. Owing to the fact that the concentration of the chelate in the macromolecular material is very low and that the dispersion must be homogeneous, it is advisable to prepare the mixture in two stages. In the first stage one prepares a pre-mixture of the whole chelate in but a portion of the macromolecular material to be treated. This pre-mixture, also called "master mixture" is then mixed with the remaining portion of the macromolecular material.

In addition, some conventional additives such as antioxidants (phenol derivatives, diphenylparaphenylenediamine, etc.) can be incorporated, preferably together with the chelates into the insulating materials.

Materials in accordance with the invention can be used for numerous applications in electrical industries, for instance for the production of insulation sheaths for high voltage electric power lines, molded insulators for electric apparatus, capacitor dielectrics, etc.

Preferred uses of the electrical insulators according to the invention are in equipment subject to high electrical fields, and particularly in insulating sheaths for high voltage electric power lines, particularly those subjected to voltages as high as 50 to 100 kV, or more.

We claim:

1. An electrical insulator consisting essentially of a void-containing polymeric macromolecular insulating material suitable for use under voltage capable of causing partial discharges in said voids containing an agent for promoting an increase of the voltage thresholds liable to cause said partial discharges, said agent being present in an amount of 0.001 to 5 percent of said polymeric macromolecular insulating material, said agent being formed by at least one metal chelate which is a derivative of an organic compound of the formula

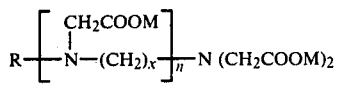

wherein
x is an integer of from 1 to 4,
n is an integer of from 0 to 4,
R is —CH$_2$COOM and, when n is not 0, R may be —OH,
M is Na or H
the metal of the chelate being one selected from the group consisting of iron, copper, zinc, aluminum, cadmium and the metal chelate being present in the material in an amount sufficient to promote the extinction of said partial discharges.

2. Electrical insulator according to claim 1, wherein the content of chelate is between 0.01 and 1% by weight.

3. Electrical insulator in accordance with claim 1, wherein the macromolecular insulating material is polyethylene.

4. Electrical insulator in accordance with claim 3, wherein the macromolecular insulating material is a "low density" polyethylene, free of any metal components except said chelate.

5. Electrical insulator in accordance with claim 1 wherein the macromolecular insulating material is a polycondensate.

6. Electrical insulator in accordance with claim 1 wherein the macromolecular insulating material is a polyaddition compound.

7. Electrical insulator in accordance with claim 5 wherein the polymeric macromolecular insulating material is a polyester.

8. Electrical insulator in accordance with claim 6 wherein the polymeric macromolecular insulating material is a polyepoxide.

9. Electrical insulator in accordance with claim 1, wherein x is 2 or 3 and n is zero, 1 or 2.

10. Electrical insulator in accordance with claim 9, wherein said chelate is a metal ethylenediamino tetracetic acid chelate.

11. Electrical insulator in accordance with claim 9, wherein the metal chelate is a metal propylenediamino tetracetic acid chelate.

12. Electrical insulator in accordance with claim 9, wherein the metal chelate is a metal N-hydroxy-ethylene-diamino-triacetic acid chelate.

13. Electrical insulator in accordance with claim 9, wherein the metal chelate is a metal diethylene triamino-pentacetic acid chelate.

14. Electrical insulator in accordance with claim 9, wherein the metal chelate is a metal nitrilo-triacetic acid chelate.

15. In an electrical apparatus operative under high electrical field and voltage comprising a conductor and a void-containing macromolecular polymer insulator, said voids being liable to give rise to partial discharges, under such high electrical fields, the improvement, for promoting an increase of the voltage thresholds liable of causing said partial discharges in the voids of said insulator, wherein said insulator comprises from 0.001 to 5 percent by weight of at least one metal chelate which is a derivative of an organic compound of the formula

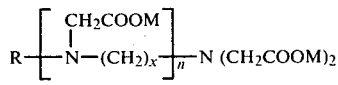

wherein
x is an integer of from 1 to 4,
n is an integer of from 0 to 4,
R is —CH$_2$COOM and, when n is not 0, R may be —OH,
M is Na or H
the metal of the chelate being one selected from the group consisting of iron, copper, zinc, aluminum and cadmium.

16. An electrical apparatus according to claim 12 wherein the apparatus is a capacitor the dielectric of which is formed of said insulator.

17. An electrical apparatus according to claim 15 wherein said conductor carries an electric current at a voltage of at least 50 kV.

18. An electrical apparatus according to claim 15, said apparatus being a high voltage electrical power line, the sheath of which is formed of said insulator.

19. An electrical apparatus according to claim 18, wherein the macromolecular material of said sheath is a "low density" polyethylene.

20. An insulator according to claim 1 wherein there is 0.01 to 1.0% of said agent present.

* * * * *

UNITED STATES PATENT AND TRADEMARK OFFICE
CERTIFICATE OF CORRECTION

PATENT NO. : 4,188,303
DATED : February 12, 1980
INVENTOR(S) : JEAN BARGE et al

It is certified that error appears in the above-identified patent and that said Letters Patent are hereby corrected as shown below:

Columns 3 and 4, in the tables, "P" should read -- $\rho$ --, each occurrence.

Columns 3 and 4, in the tables, "$>10^{19}$" should read -- $\gg 10^{19}$ --, each occurrence.

Signed and Sealed this

Seventeenth Day of February 1981

[SEAL]

Attest:

RENE D. TEGTMEYER

Attesting Officer

Acting Commissioner of Patents and Trademarks